(12) United States Patent
Chu et al.

(10) Patent No.: US 8,000,352 B2
(45) Date of Patent: Aug. 16, 2011

(54) SYNCHRONIZER FOR COMMUNICATION DEVICE AND ACCESS POINT

(75) Inventors: Yuan-Sun Chu, Minsyong Township, Chiayi County (TW); Ting-Huan Li, Dounan Township, Yunlin County (TW); Yi-Ren Chen, Kaohsiung (TW); Chia-Ying Huang, Kaohsiung (TW); Kuo-Hua Pu, Meinong Township, Kaohsiung County (TW); Chi-Fang Li, Minsyong Township, Chiayi County (TW)

(73) Assignee: National Chung Cheng University, Chia-Yi (TW)

( * ) Notice: Subject to any disclaimer, the term of this patent is extended or adjusted under 35 U.S.C. 154(b) by 206 days.

(21) Appl. No.: 12/419,911

(22) Filed: Apr. 7, 2009

(65) Prior Publication Data
US 2010/0142506 A1    Jun. 10, 2010

(30) Foreign Application Priority Data

Dec. 5, 2008   (TW) ............................... 97147564 A

(51) Int. Cl.
*H04J 3/06* (2006.01)
(52) U.S. Cl. ....................................... 370/503
(58) Field of Classification Search ................. 370/203, 370/204, 208, 310, 315, 316, 319, 320, 328, 370/329, 335, 342, 321, 324, 345, 350, 464, 498, 503, 509, 512, 513
See application file for complete search history.

(56) References Cited

U.S. PATENT DOCUMENTS

| | | | | |
|---|---|---|---|---|
| 5,920,591 | A * | 7/1999 | Fukasawa et al. | 375/142 |
| 6,385,187 | B1 * | 5/2002 | Ahn et al. | 370/342 |
| 6,865,177 | B1 * | 3/2005 | Park et al. | 370/350 |
| 2004/0132471 | A1 * | 7/2004 | Pappalardo et al. | 455/502 |

* cited by examiner

*Primary Examiner* — Kwang B Yao
*Assistant Examiner* — Obaidul Huq
(74) *Attorney, Agent, or Firm* — Ming Chow; Sinorica, LLC

(57) ABSTRACT

A synchronizer for a communication device and an access point, which is installed inside the communication device and comprises a coefficient generator generating a set of coefficient code. A parallel-to-serial converter receives a set of input code from an access point, performs a parallel-to-serial conversion on the set of input code and outputs a result. A coefficient element array includes a plurality of coefficient elements interconnecting with each other. Each of the coefficient elements receives the set of input code from the parallel-to-serial converter and receives the set of coefficient code, and then performs a passive or active correlation operation on the set of input code and the set of coefficient code to output a correlation value to the access point for synchronizing signals of the communication device and the access point.

14 Claims, 10 Drawing Sheets

SYNCHRONIZER FOR COMMUNICATION DEVICE AND ACCESS POINT

BACKGROUND OF THE INVENTION

1. Field of the Invention

The present invention relates to a synchronizer, particularly to a synchronizer for a communication device and an access point.

2. Description of the Related Art

In a wireless WCDMA (Wideband Code Division Multiple Access) communication system, synchronization is an important procedure. When powered on, a mobile phone has to find out the optimal access point as soon as possible. With the popularization of the 3G system and the wireless network, a single device is usually required to work in the two systems. In South Korea, Japan, and Taiwan, the licenses of WCDMA and CDMA 2000 (Code Division Multiple Access 2000) are opened simultaneously. In such a condition, the 3G system should have the functions of WCDMA and CDMA 2000. Besides, the wireless network has been very popular now. Below is introduced the synchronization process of a WCDMA system and a CDMA system.

The synchronization process of a WCDMA mobile phone and an access point includes three stages each using a special channel to undertake synchronization. The three channels are the primary synchronization channel (P-SCH), the secondary synchronization channel (S-SCH), and the common pilot channel (CPICH). There are three types of data transmitted by the three channels: the primary synchronization code (PSC), the secondary synchronization codes (SSCs), and the scrambling code. A mobile phone just turned on does not know the timing of the frame and the slot of the channel until the mobile phone finds out the primary synchronization code. As there is none reference timing, the FIR (Finite Impulse Response)-based match filter is used to search for the related values. Then, the detection circuit is used to find out from 2560 chips the most probable chip where the slot initiates. After the synchronization of the primary synchronization channel is completed, the synchronization of the secondary synchronization channel begins. When the secondary synchronization code starts to be searched, the initiation times of all the slots have been known. Therefore, the active correlator is used to search for the secondary synchronization code. After the entire frame has been searched, a Comma-Free Reed-Solomon (CFRS) code is obtained. After the CFRS code is decoded, the frame boundary and the scrambling code group are obtained. The frame boundary and the scrambling code group can facilitate the active correlator to obtain the scrambling code sent out by the access point. The completion of the three stages of synchronizations is equal to the completion of the synchronization of the WCDMA system.

In a CDMA2000 system, the synchronization of an access point and a mobile phone uses the pilot channels. The pilot channels use a short pseudo noise code with a length of 32768 chips, and 512 chips can be issued therefrom. All the access points use the same pseudo noise code, but different access points transmit the pseudo noise code at different chips. The match filter is used to find out the initial value of the pseudo noise code and synchronize the mobile phone and the access point.

The de-correlation devices of the current DSSS (Direct Sequence Spread Spectrum) communication system are categorized into the match-filter circuit and the correlator circuit. Different systems use different DSSS codes and different synchronization circuits. Incorporating two communication systems in a single mobile phone should bring about some technical problems although it is the tendency.

To overcome the abovementioned problems, the present invention proposes a synchronizer for a communication device and an access point, which integrates the synchronization functions of the 3G mobile communication systems and advances the timing that the baseband chip enters the market.

SUMMARY OF THE INVENTION

The primary objective of the present invention is to provide a synchronizer for a communication device and an access point, which integrates the synchronization functions of the WCDMA system and the CDMA2000 system of the 3G mobile communication systems without consuming too much hardware, wherefore the baseband chip manufacturers may directly adopt the present invention in their products and needn't respectively fabricate different chips for different systems, whereby the manufacturers can advance the timing that the baseband chips enter the market.

Another objective of the present invention is to provide a synchronizer for a communication device and an access point, which has the synchronization functions of the WCDMA system and the CDMA2000 system, whereby the present invention can reduce the fabrication cost and promote the convenience of communication.

To achieve the abovementioned objectives, the present invention proposes a synchronizer for a communication device and an access point, which is installed inside the communication device and comprises a coefficient generator generating a set of coefficient code; a parallel-to-serial converter receiving a set of input code, performing a parallel-to-serial conversion on the received input code and outputting the result; and a coefficient element array including a plurality of coefficient elements interconnecting with each other, wherein each coefficient element receives an input code from the parallel-to-serial converter and receives a coefficient code, and then performs a passive or active correlation operation on the input code and the coefficient code to output a correlation value to the access point, whereby the signals of a communication device and an access point are synchronized.

Below, the embodiments are described in detail in cooperation with the drawings to make easily understood the technical contents, characteristics and accomplishments of the present invention.

DETAILED DESCRIPTION OF THE INVENTION

Figure 1:
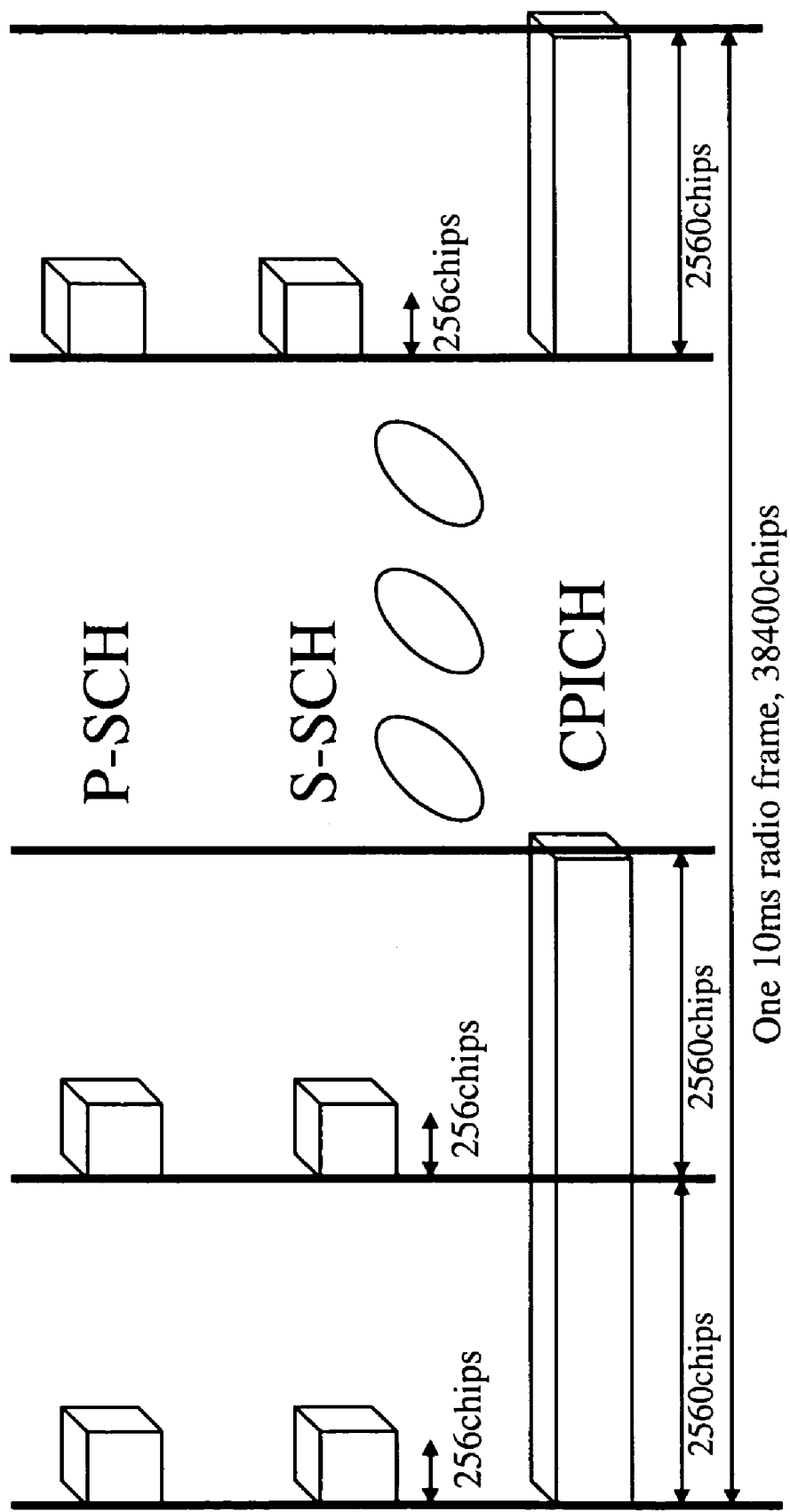
FIG. 1 is a diagram schematically showing the architecture of frames and slots of a WCDMA system in a conventional technology.
Figure 2:
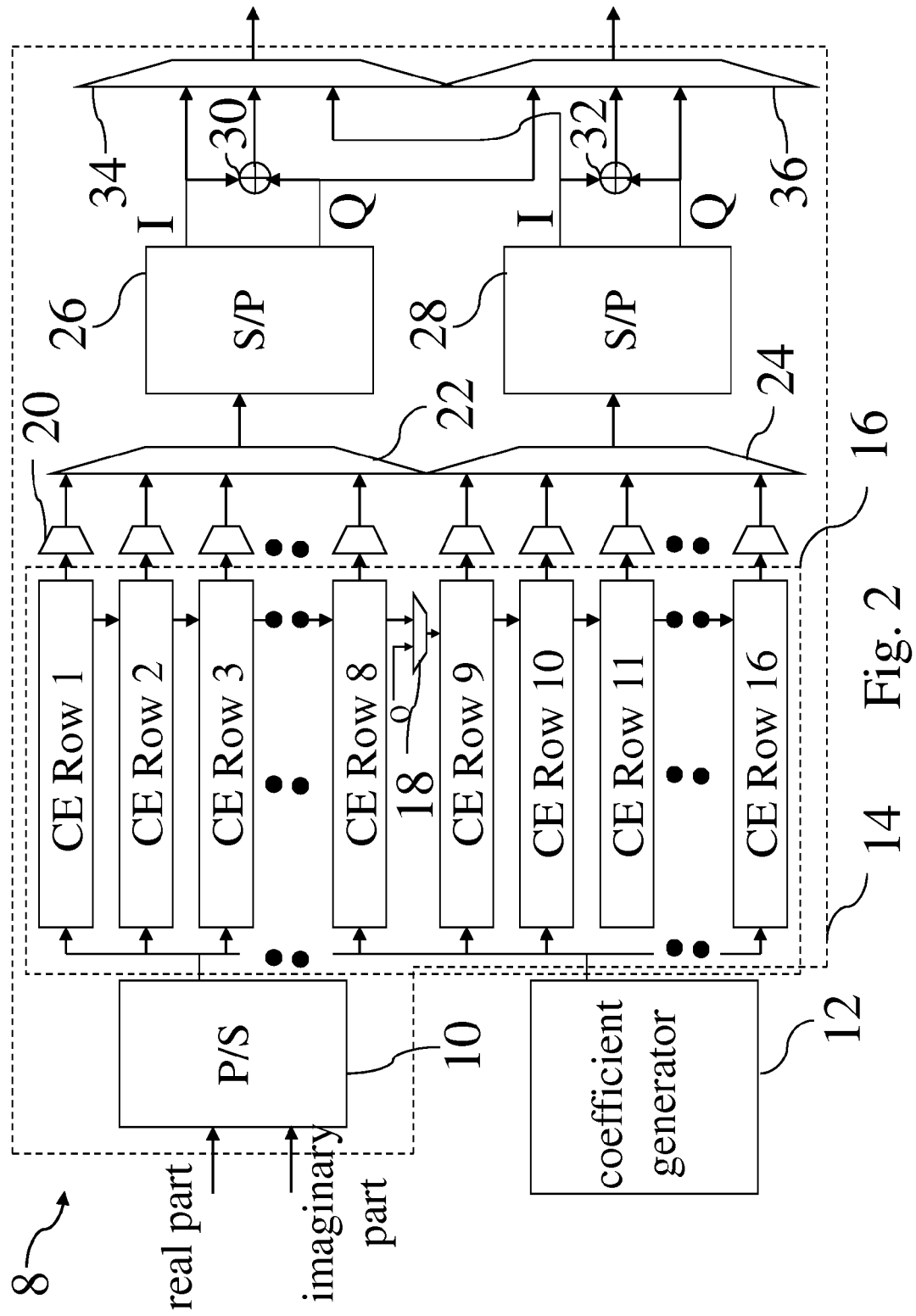
FIG. 2 is a diagram schematically showing the circuit of a synchronizer according to the present invention.

Refer to FIG. 2. The present invention proposes a synchronizer, which is installed inside the communication device and comprises a coefficient generator 12 generating a set of coefficient code; a parallel-to-serial converter 10 receiving a set of input code, performing a parallel-to-serial conversion on the received input code and outputting the result; and a coefficient element array 16 including a plurality of coefficient elements (CE) interconnecting with each other, wherein each coefficient element receives an input code from the parallel-to-serial converter 10 and receives a coefficient code, and then performs a passive or active correlation operation on the input code and the coefficient code to output a correlation value to the access point, whereby the signals of a communication device and an access point are synchronized. The coefficient element array 16 is a square matrix containing 16×16 pieces of coefficient elements, and each row thereof has 16 pieces of cascaded coefficient elements, and the coefficient element array 16 totally has 16 rows. The eighth row and the ninth row are cascaded by a multiplexer 18. The multiplexer 18 determines whether to connect the combination of from the $1^{st}$ row to the $8^{th}$ row with the combination of from the $9^{th}$ row to the $16^{th}$ row. Such a connection will be used in the CDMA2000 system. According to the synchronization states, the coefficient code will have different codewords. When the access point is performing the synchronization of the primary synchronization channel of the WCDMA system, the codewords of the coefficient code match the synchronization of the primary synchronization channel. When the access point is performing the synchronization of the secondary synchronization channel of the WCDMA system, the codewords of the coefficient code match the synchronization of the secondary synchronization channel. When the access point is performing the synchronization of the common pilot channel of the WCDMA system, the coefficient code is a scrambling code. When the access point is performing the synchronization of the CDMA2000 system, the codewords of the coefficient code match the synchronization of the CDMA2000 system.

The coefficient element integration array 14 includes the coefficient element array 16 and the parallel-to-serial converter 10. Each row of the coefficient element array 16 is connected to a multiplexer 20 receiving the correlation values output by the sixteen pieces of coefficient elements of the same row. The multiplexer 20 selects one piece of data from the received data and outputs the selected data to a multiplexer 22 or a multiplexer 24. The multiplexer 22 is used to receive the correlation values output by from the $1^{st}$ row to the $8^{th}$ row of the coefficient element array 16, and then the multiplexer 22 selects one piece of data from the received data to output. The multiplexer 24 is used to receive the correlation values output by from the $9^{th}$ row to the $16^{th}$ row of the coefficient element array 16, and then the multiplexer 24 selects one piece of data from the received data to output. A serial-to-parallel converter 26 receives the data output by the multiplexer 22, performs a serial-to-parallel conversion on the data, and outputs first real-part correlation data and first imaginary-part correlation data, i.e. the I-channel data and the Q-channel data. A serial-to-parallel converter 28 receives the data output by the multiplexer 24, performs a serial-to-parallel conversion on the data, and outputs second real-part correlation data and second imaginary-part correlation data, i.e. the I-channel data and the Q-channel data. An adder 30 receives the first real-part correlation data and the first imaginary-part correlation data and performs an addition calculation on them to output first integration correlation data. An adder 32 receives the second real-part correlation data and the second imaginary-part correlation data and performs an addition calculation on them to output second integration correlation data. A multiplexer 34 receives the first real-part correlation data, the second real-part correlation data and the first integration correlation data, selects one piece of data from the received data, and outputs the selected data to the access point. A multiplexer 36 receives the first imaginary-part correlation data, the second imaginary-part correlation data and the second integration correlation data, selects one piece of data from the received data, and outputs the selected data to the access point.

The parallel-to-serial converter 10 processes the input code and transmits the result to the 256 pieces of coefficient elements, and the coefficient code is also transmitted to the 256 pieces of coefficient elements at the same time. Each coefficient element performs calculation on the input code and the coefficient code and outputs a correlation value. After the selections of the 16 pieces of multiplexers 20, the multiplexer 22 and the multiplexer 24, the coefficient element array 16 outputs two correlation values. The serial-to-parallel converter 26/28 performs a serial-to-parallel conversion on the data output by the multiplexer 22/24. The adder 30/32 performs addition operations of complex multiplication on the I-channel data and the Q-channel data. Then, the multiplexer 34/36 determines whether to output the data output by the row or the data output by the adder, and which row of data is output.

Figure 3:
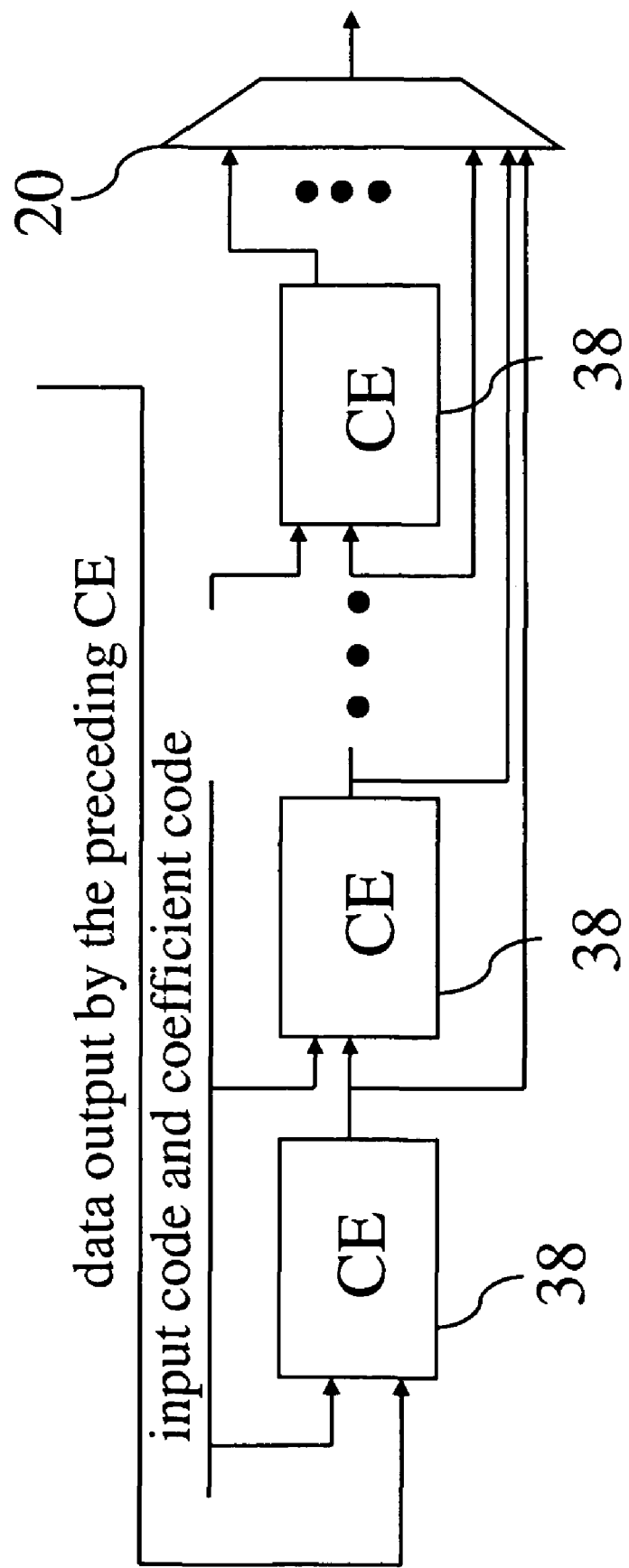
FIG. 3 is a diagram schematically showing the circuit of each row of from the $2^{nd}$ row to the $8^{th}$ row and from $10^{th}$ row to $16^{th}$ row according to the present invention.

Refer to FIG. 2 and FIG. 3. FIG. 3 is a diagram schematically showing the circuit of each row of from the $2^{nd}$ row to the $8^{th}$ row and from $10^{th}$ row to $16^{th}$ row according to the present invention. Each row contains 16 pieces of cascaded coefficient elements 38. Each coefficient element 38 receives the input code, the coefficient code and the correlation value output by the preceding coefficient element 38. All the correlation values output by the 16 pieces of coefficient elements 38 of the same row are received by the multiplexer 20 of the same row. The multiplexer 20 selects one correlation value from the received correlation values and outputs the selected correlation value to the multiplexer 22 or the multiplexer 24. The combination of the cascaded coefficient elements 38 is a match filter able to perform passive correlation calculations.

Figure 4:
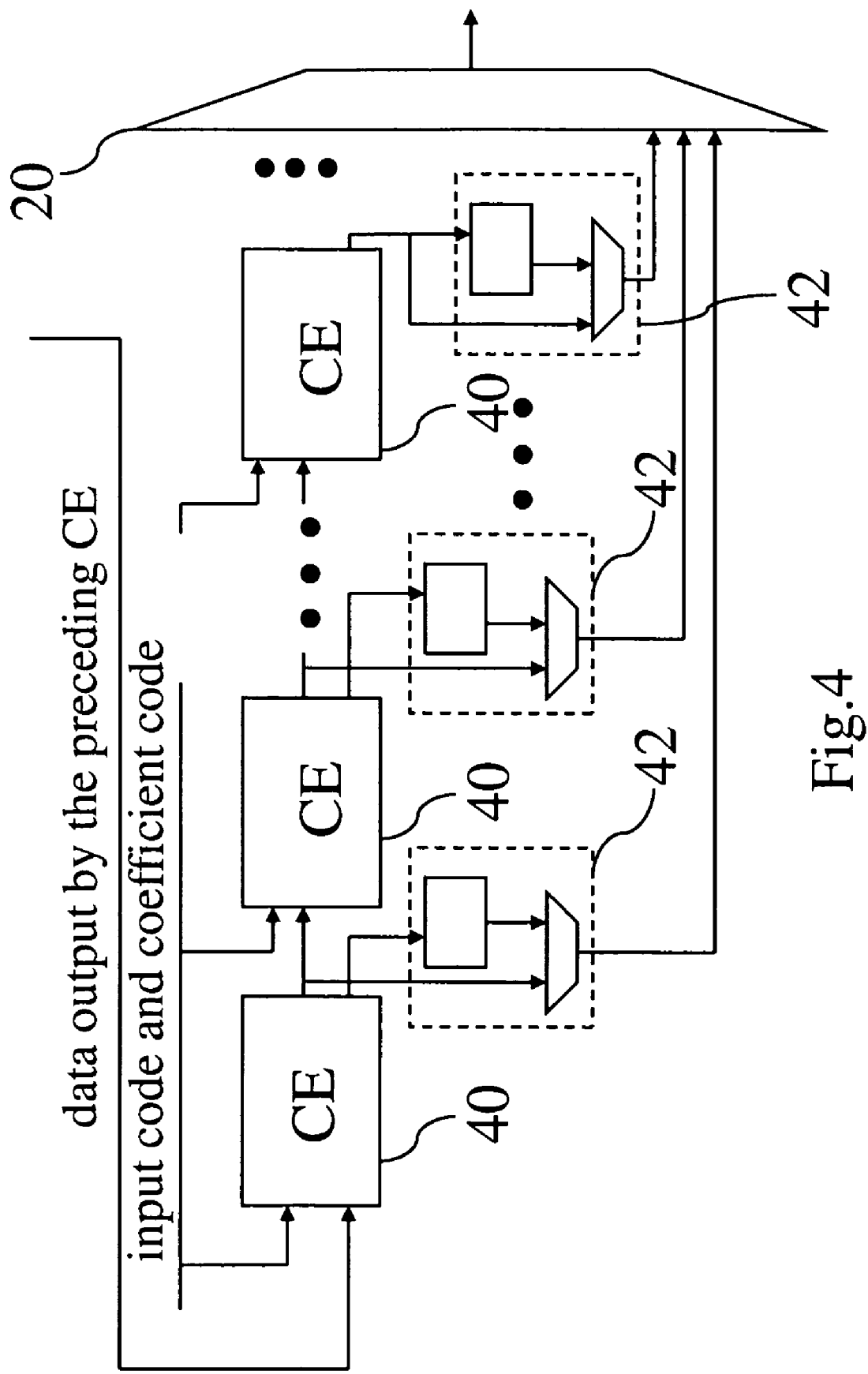
FIG. 4 is a diagram schematically showing the circuit of the $1^{st}$ row or the $9^{th}$ row according to the present invention.

Refer to FIG. 2 and FIG. 4. FIG. 4 is a diagram schematically showing the circuit of the $1^{st}$ row or the $9^{th}$ row according to the present invention. Each row contains 16 pieces of cascaded coefficient elements 40. Each coefficient element 40 receives the input code, the coefficient code and the correlation value output by the preceding coefficient element 38. All the correlation values output by the 16 pieces of coefficient elements 40 of the same row are received by the multiplexer 20 of the same row. The multiplexer 20 selects one correlation value from the received correlation values and outputs the selected correlation value to the multiplexer 22 or the multiplexer 24. In addition to the passive correlation calculations, the $1^{st}$ row and the $9^{th}$ row can also perform the active correlation calculations. Each coefficient element 40 of the $1^{st}$ row and the $9^{th}$ row has a register area 42. When the coefficient element 40 performs the active correlation calculations on the input code and the coefficient code, the register area 42 can temporarily store the correlation values output by the coefficient elements 40. The correlation values are then output to a multiplexer 20 according to a control signal.

Figure 5:
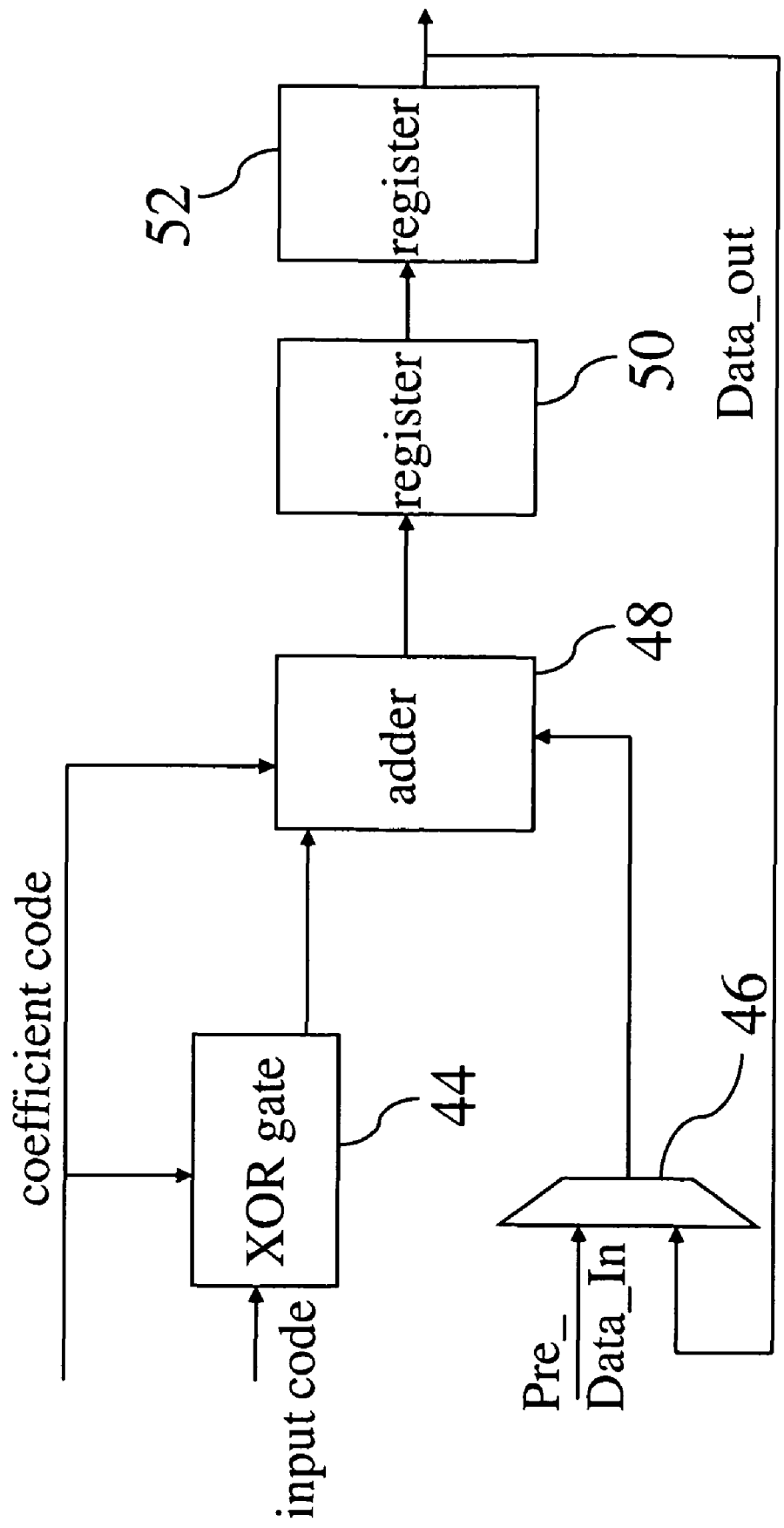
FIG. 5 is a diagram schematically showing the circuit of a coefficient element according to the present invention.

Refer to FIG. 5 a diagram schematically showing the circuit of a coefficient element according to the present invention. The coefficient element comprises an XOR gate 44 receiving and calculating the input code and the coefficient code to output a first control code; an adder 48 receiving the coefficient code and the first control code; a multiplexer 46 receiving the correlation value output by the coefficient element itself and the correlation value output by the preceding coefficient element, and selecting one of the correlation values to output to the adder 48, wherein the adder 48 calculates the received data and outputs a second control code; a register 50 storing the real-part data, i.e. the I-channel data, of the second control code; and a register 52 storing the imaginary-part data, i.e. the Q-channel data, of the second control code. The register 52 can receives the data stored in the register 50 and outputs a correlation value. The input code has been processed by the parallel-to-serial converter 10 before entering the coefficient element. Therefore, in a clock cycle of data, the positive edge is the I-channel data, and the negative edge is the Q-channel data. Thus, the clock of the register is two times faster than the original clock.

When the input code and the coefficient code enter the coefficient element, the coefficient element performs an active correlation operation if the adder 48 receives the correlation value output by the coefficient element itself. When the adder 48 receives the correlation value output by the preceding coefficient element, the coefficient element performs a passive correlation operation.

Figure 6:
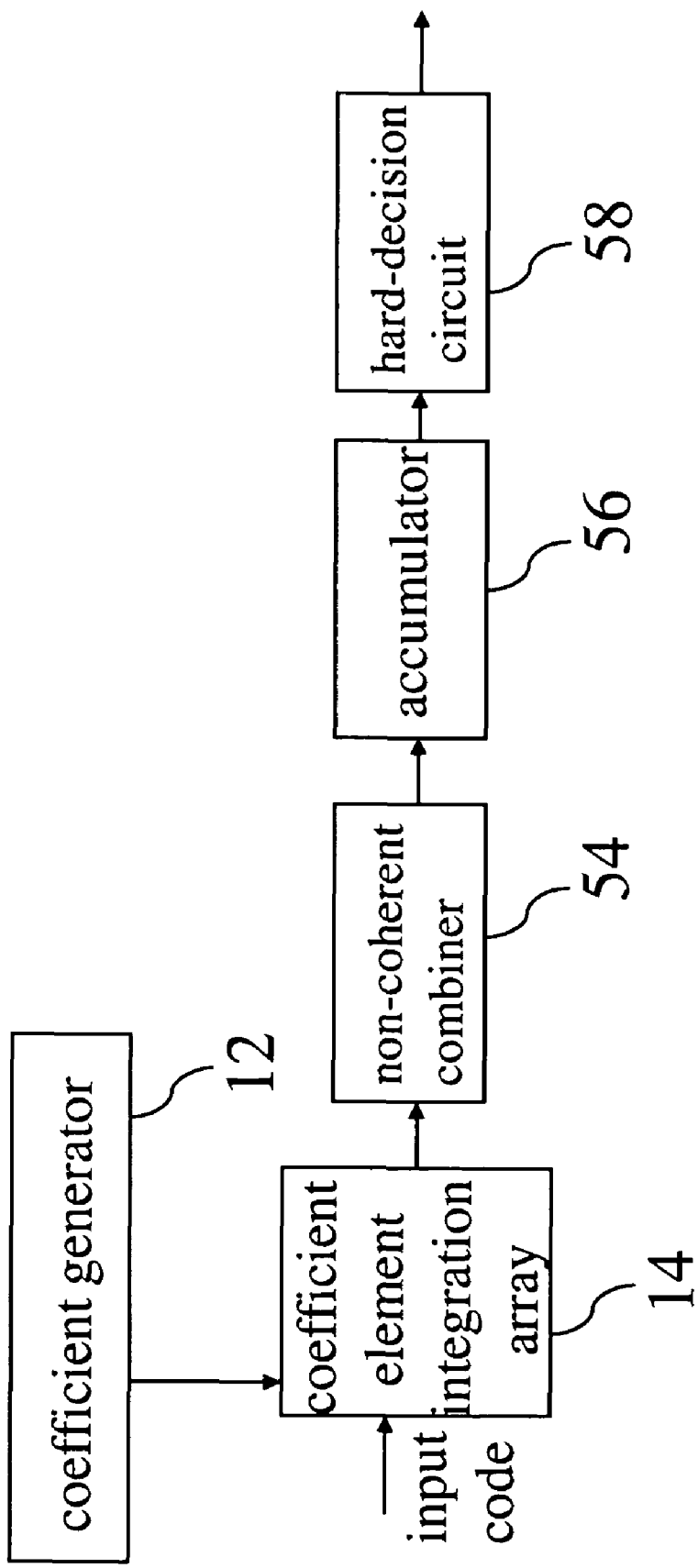
FIG. 6 is a diagram schematically showing the circuit for performing the synchronization of the primary synchronization channel in a WCDMA system.

Below is described the first stage of the synchronization process of a WCDMA communication system. Refer to FIG. 2 and FIG. 6. The first stage of the synchronization process concerns the synchronization of the primary synchronization channel (P-SCH). The first stage is to find out the slot boundary. The primary synchronization code is transmitted in form of complex numbers. The P-SCH synchronization circuit includes a coefficient generator 12, a coefficient element integration array 14, a non-coherent combiner 54, an accumulator 56, and a hard-decision circuit 58. The coefficient generator 12 and the coefficient element integration array 14 perform the de-correlation of the primary synchronization code and calculate the correlation values. The non-coherent combiner 54 amplifies the signal output by the coefficient element integration array 14, performs an addition calculation on the real par and imaginary part of the signal, and outputs the result to the accumulator 56. The accumulator 56 accumulates the 2560 chips of a slot to have a length of a frame to achieve higher reliability and reduce error rate. The obtained 2560 pieces of values are sent to the hard-decision circuit 58 searching for a maximum value to find out the slot boundary. As the primary synchronization code is only transmitted during the front 250 pieces of chips of each slot, the time point of finding the maximum value should be at the $256^{th}$ chip. The slot boundary can thus be calculated from the time point of finding the maximum value and the time length of 250 pieces of chips.

Figure 7:
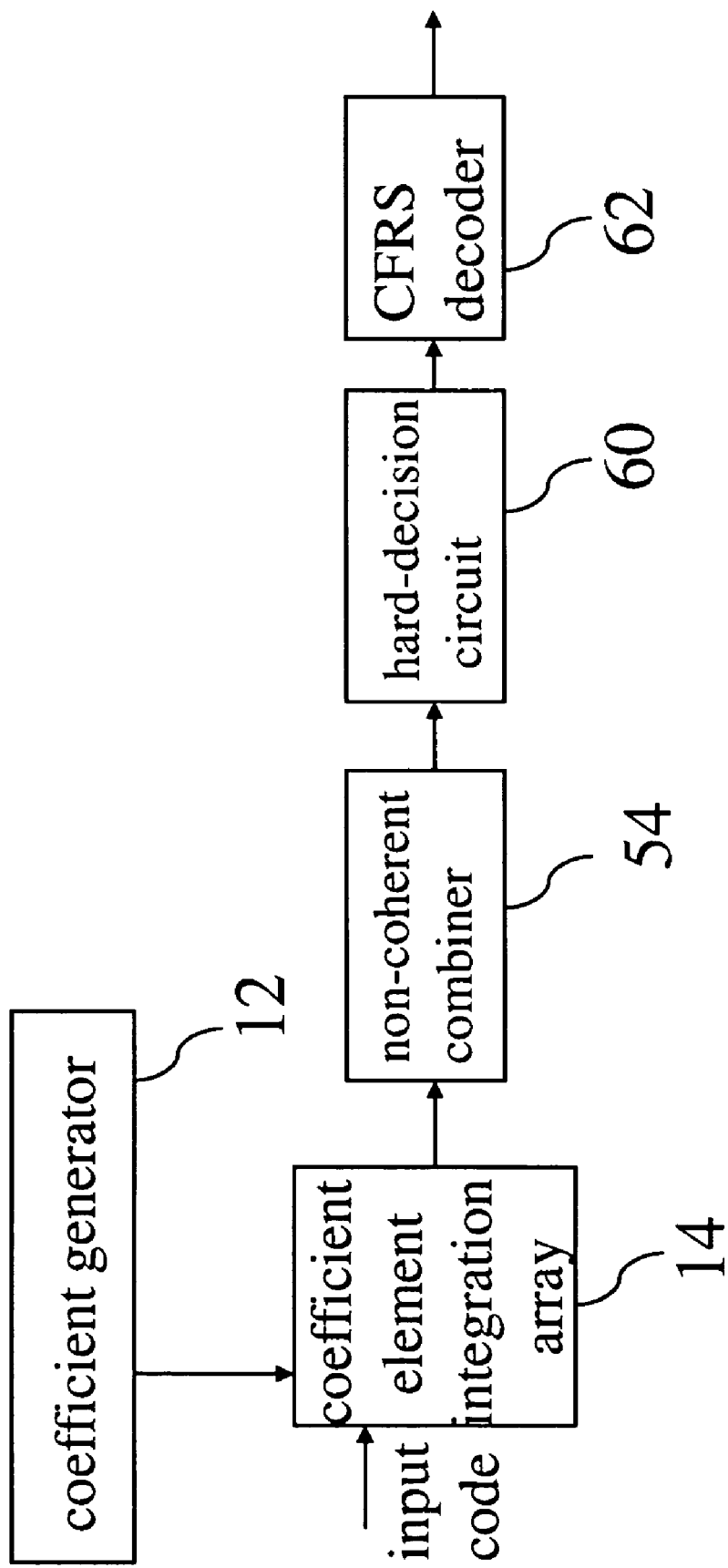
FIG. 7 is a diagram schematically showing the circuit for performing the synchronization of the secondary synchronization channel in a WCDMA system.

Below is described the second stage of the synchronization process of a WCDMA communication system. Refer to FIG. 2 and FIG. 7. The second stage of the synchronization process concerns the synchronization of the secondary synchronization channel (S-SCH). The second stage uses the reference time obtained in the first stage to find out the frame boundary and the scrambling code group of the access point. The secondary synchronization code has sixteen complex code groups each with a length of 256 chips. The S-SCH synchronization circuit includes a coefficient generator 12, a coefficient element integration array 14, a non-coherent combiner 54, a hard-decision circuit 60 and a CFRS (Comma-Free Reed-Solomon) decoder 62. The coefficient generator 12 and the coefficient element integration array 14 perform the active de-correlation of the secondary synchronization code. The non-coherent combiner 54 performs a non-coherent combination on the signals output by the coefficient element integration array 14 and outputs the result to hard-decision circuit 60. The hard-decision circuit 60 finds out the secondary synchronization code $C_{ssc,k}$ output by the slot. After the calculation of a complete frame, fifteen secondary synchronization codes $C_{ssc,k}$ are obtained. The fifteen codes form a codeword of a CFRS code. Then, the CFRS decoder 62 is used to obtain the initial serial number of the slot at the start period of the S-SCH synchronization and the serial number of the related scrambling code group. According to the initial serial number of the slot, the initial position of the frame can be worked out. From the serial number of the scrambling code group is learned which group of the scrambling code the access point outputs. Thereby, the searching of 512 groups of scrambling codes is reduced to the searching of 8 groups of scrambling codes.

Figure 8:
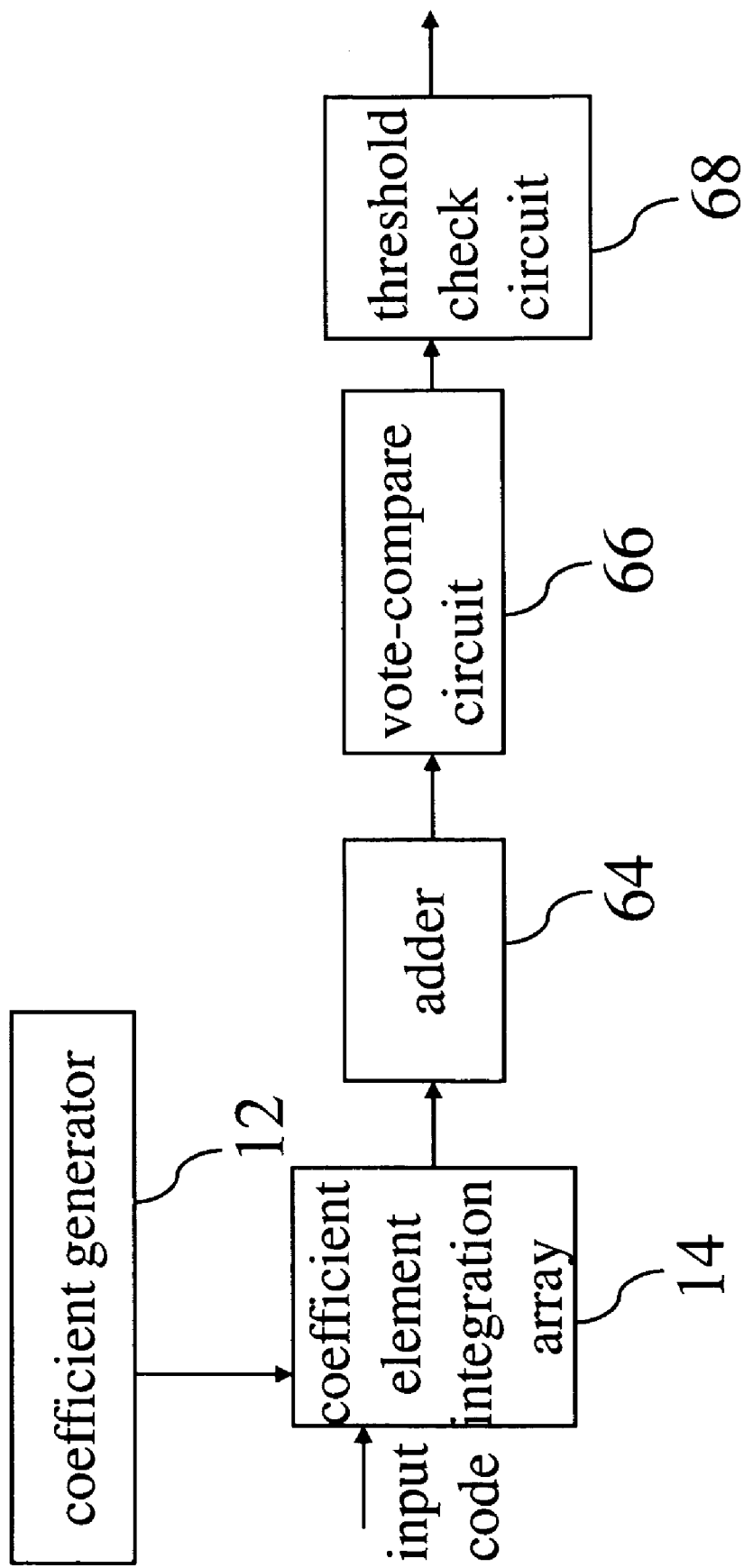
FIG. 8 is a diagram schematically showing the circuit for performing the synchronization of the common pilot channel in a WCDMA system.

Below is described the third stage of the synchronization process of a WCDMA communication system. Refer to FIG. 2 and FIG. 8. The third stage of the synchronization process concerns the synchronization of the common pilot channel (CPICH). The third stage is to search for the scrambling code. With the serial number of the scrambling code group and the frame boundary obtained in the second stage, the searching for scrambling code is undertaken in the third stage. The WCDMA system uses a complex scrambling code having a length of 38400 chips. As the quantity of the searched groups of scrambling codes is reduced to from 512 to 8, the present invention proposes a hardware architecture dedicated to searching 8 groups of probable scrambling codes. The hardware architecture uses 16 pieces of coefficient elements of the coefficient element integration array 14 (8 pieces for the real part, and 8 pieces for the imaginary part) to calculate 8 groups of probable scrambling codes and the correlation value of the recipient end. The CPICH synchronization circuit includes a coefficient generator 12, a coefficient element integration array 14, an adder 64, a vote-compare circuit 66, and a threshold check circuit 68. The coefficient generator 12 receives the data output by the preceding stage and generates the 8 groups of probable scrambling codes to solve the scrambling code output by CPICH. The scrambling code is accumulated to have a length of 256 chips to achieve a higher-reliability predicted value. The coefficient generator 12 contains 8 scrambling-code generators used to generate 8 scrambling codes for the related group. The adder 64 performs addition operations on the signals output by the coefficient element integration array 14. While the signals have accumulated to have a length of 256 chips, the vote-compare circuit 66 votes for a scrambling code from the 8 probable scrambling codes. When the vote-compare circuit 66 has performed the vote for an interval of a frame, the threshold check circuit 68 checks whether there is a scrambling code exceeding the threshold set by the system. If the answer is yes, it is announced that the access-point searching is completed.

Figure 9:
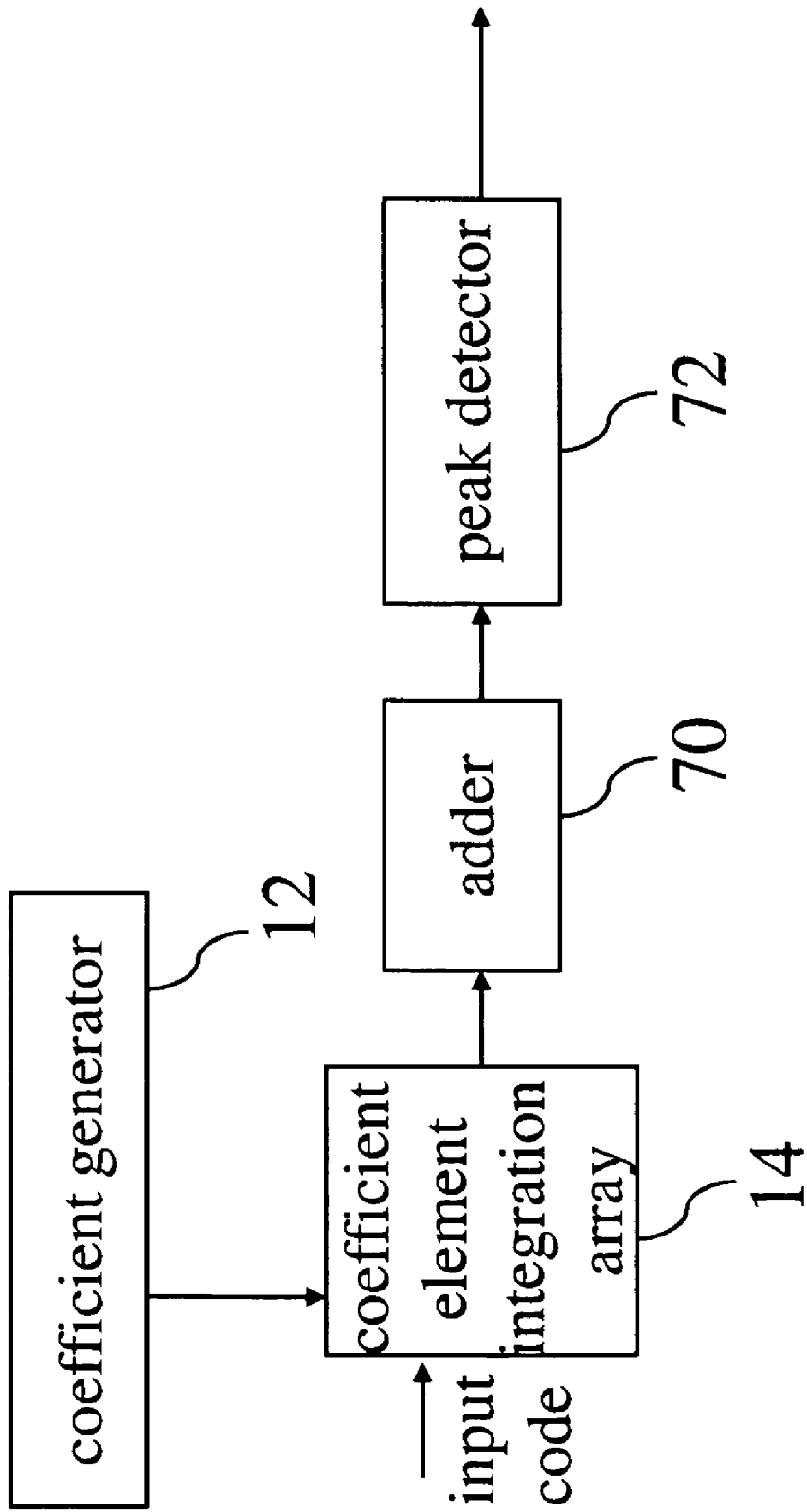
FIG. 9 is a diagram schematically showing the circuit for performing the synchronization of a CDMA2000 system.
Figure 10:
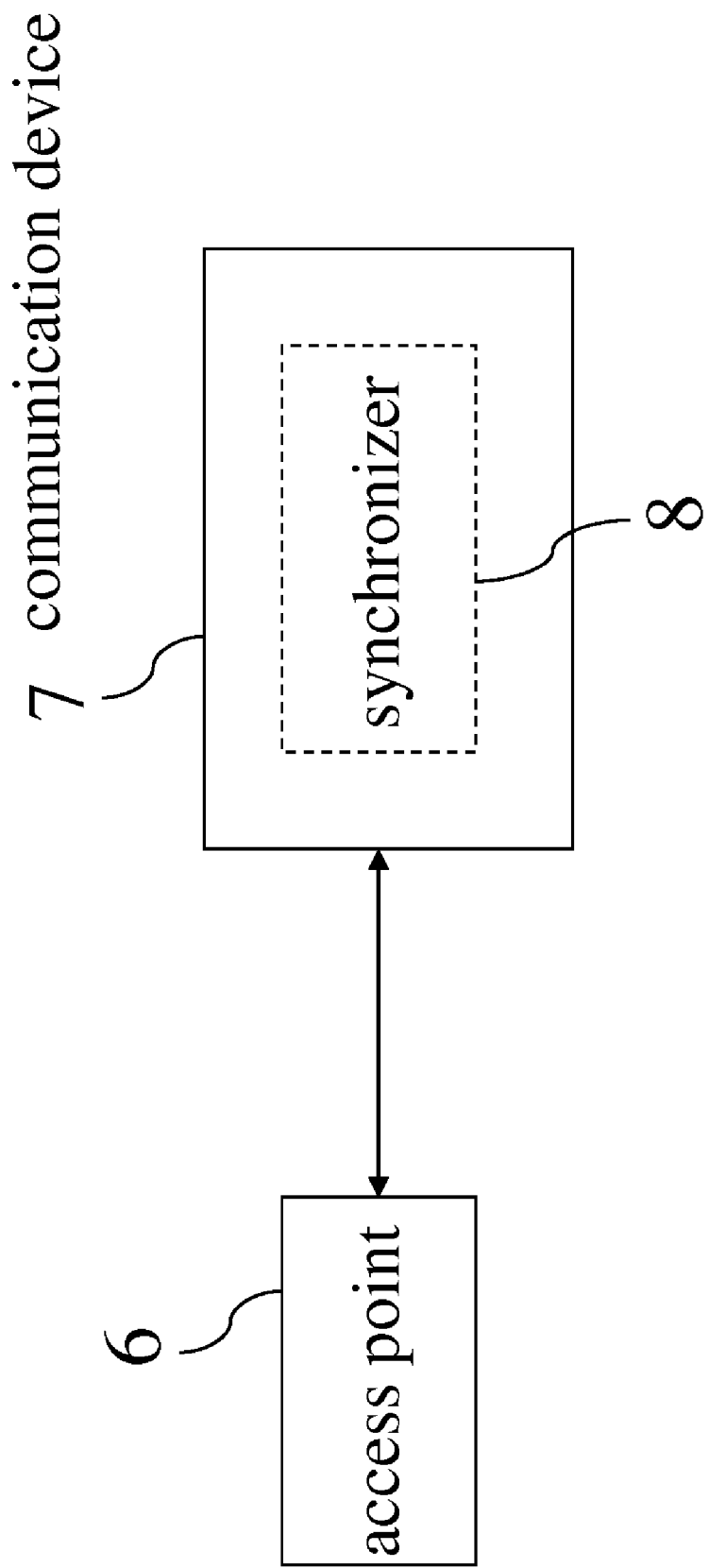
FIG. 10 is a diagram showing a synchronizer is installed in the communication device.

Below is described the synchronization process of a CDMA 2000 communication system. Refer to FIG. 2 and FIG. 9. The synchronization process of a CDMA 2000 communication system concerns the synchronization of the pilot channel. Owing to the characteristics of the algorithm and the hardware, the present invention adopts 256 pieces of coefficient elements to perform calculations. As the CDMA 2000 communication system adopts a short pseudo noise code as the complex code, the present invention divides the coefficient element array 16 into two parts, wherein the front 128 pieces of coefficient elements deal with the I-channel data, and the rear 128 pieces of coefficient elements deal with the Q-channel data. The adder 70 performs the calculation of summing the squares of the signals output by the coefficient element integration array 14. Then, the peak detector 72 detects the peak value, and the start time point of the short pseudo noise code can be worked out thereby.

In conclusion, the present invention integrates the synchronization functions of the WCDMA system and the CDMA2000 system of the 3G mobile communication systems without consuming too much hardware. Therefore, the baseband chip manufacturers may directly adopt the present invention in their products and needn't respectively fabricate different chips for different systems. Thus, the manufacturers can reduce the fabrication cost and can advance the timing that the baseband chips enter the market.

The embodiments described above are only to exemplify the present invention but not to limit the scope of the present invention. Therefore, any equivalent modification or variation according to the shapes, structures, characteristics or spirit disclosed in the present invention is to be also included within the scope of the present invention.

What is claimed is:

1. A synchronizer for both a communication device and an access point comprises:
    the synchronizer being installed inside the communication device;
    a coefficient generator generating a set of coefficient code;
    a parallel-to-serial converter receiving a set of input code from an access point, performing a parallel-to-serial conversion on said set of input code and outputting a result;
    a coefficient element array including a plurality of coefficient elements interconnecting with each other, wherein each of said coefficient elements receives said set of input code from said parallel-to-serial converter and receives said set of coefficient code, and then performs a passive correlation operation or an active correlation operation on said set of input code and said set of coefficient code to output a correlation value to said access point for synchronizing signals of said communication device and said access point;
    said coefficient element array is a square matrix containing 16×16 pieces of coefficient elements;
    each row of said coefficient element array has 16 pieces of said coefficient elements connected in series, and said coefficient element array totally has 16 rows;
    each row of said coefficient element array is connected to a first multiplexer; and
    said first multiplexer receives correlation values output by 16 pieces of said coefficient elements of one row of said coefficient element array and selects one of said correlation values to output.

2. The synchronizer for both the communication device and the access point according to claim 1, wherein from the $2^{nd}$ row to the $8^{th}$ row and from $10^{th}$ row to $16^{th}$ row of said coefficient element array performs a passive correlation operation on said set of input code and said set of coefficient code.

3. The synchronizer for both the communication device and the access point according to claim 1, wherein each said coefficient element of the $1^{st}$ row and the $9^{th}$ row of said coefficient element array has a register area; when each said coefficient element of the $1^{st}$ row and the $9^{th}$ row of said coefficient element array performs an active correlation calculation on said set of input code and said set of coefficient code, said register areas temporarily store correlation values output by said coefficient elements and then outputs said correlation values to said first multiplexer according to a control signal.

4. The synchronizer for both the communication device and the access point according to claim 1, wherein the $1^{st}$ row and the $9^{th}$ row of said coefficient element array performs a passive correlation operation on said set of input code and said set of coefficient code.

5. The synchronizer for both the communication device and the access point according to claim 1, wherein when said access point is performing synchronization of a primary synchronization channel of a WCDMA system, codewords of said set of coefficient code match synchronization of said primary synchronization channel.

6. The synchronizer for both the communication device and the access point according to claim 1, wherein when said access point is performing synchronization of a secondary synchronization channel of a WCDMA system, codewords of said set of coefficient code match synchronization of said secondary synchronization channel.

7. The synchronizer for both the communication device and the access point according to claim 1, wherein when said access point is performing synchronization of a common pilot channel of a WCDMA system, said set of coefficient code is a scrambling code.

8. The synchronizer for both the communication device and the access point according to claim 1, wherein when said access point is performing synchronization of a CDMA2000 system, codewords of said set of coefficient code match synchronization of said CDMA2000 system.

9. The synchronizer for both the communication device and the access point according to claim 1, wherein each of said coefficient element comprises
    an XOR gate receiving and calculating said set of input code and said set of coefficient code to output a first control code;
    an adder receiving said set of coefficient code and said first control code, and receiving a correlation value output by said coefficient element itself or a correlation value output by a preceding coefficient element, and calculating received data to output a second control code;
    a first register storing real-part data of said second control code; and
    a second register storing imaginary-part data of said second control code, receiving real-part data of said second control code, and outputting a correlation value.

10. The synchronizer for both the communication device and the access point according to claim 9, wherein if said adder receives a correlation value output by said coefficient element itself, said coefficient element performs an active correlation operation.

11. The synchronizer for both the communication device and the access point according to claim 9, wherein if said adder receives a correlation value output by said preceding coefficient element, said coefficient element performs a passive correlation operation.

12. The synchronizer for both the communication device and the access point according to claim 9, wherein said coefficient element further comprises a multiplexer receiving a correlation value output by said coefficient element itself and a correlation value output by said preceding coefficient element, and selecting one of said correlation values to output to said adder.

13. The synchronizer for both the communication device and the access point according to claim 1, wherein the $8^{th}$ row and the $9^{th}$ row of said coefficient element array are cascaded via a multiplexer; said multiplexer is used to determine whether to connect a combination of from the $1^{st}$ row to the $8^{th}$ row of said coefficient element array with a combination of from the $9^{th}$ row to the $16^{th}$ row of said coefficient element array.

14. The synchronizer for both the communication device and the access point according to claim 1 further comprising
- a second multiplexer receiving correlation values output by said first multiplexers respectively corresponding to from the 1st row to the 8th row of said coefficient element array, and then selecting one of said correlation values to output;
- a third multiplexer receiving correlation values output by said first multiplexers respectively corresponding to from the 9th row to the 16th row of said coefficient element array, and then selecting one of said correlation values to output;
- a first serial-to-parallel converter receiving data output by said second multiplexer, performing a serial-to-parallel conversion on said data, and outputting first real-part correlation data and first imaginary-part correlation data;
- a second serial-to-parallel converter receiving data output by said third multiplexer, performing a serial-to-parallel conversion on said data, and outputting second real-part correlation data and second imaginary-part correlation data;
- a first adder receiving said first real-part correlation data and said first imaginary-part correlation data and performing an addition calculation on said first real-part correlation data and said first imaginary-part correlation data to output first integration correlation data;
- a second adder receiving said second real-part correlation data and said second imaginary-part correlation data and performing an addition calculation on said second real-part correlation data and said second imaginary-part correlation data to output second integration correlation data;
- a fourth multiplexer receiving said first real-part correlation data, said second real-part correlation data and said first integration correlation data, selects one of said first real-part correlation data, said second real-part correlation data and said first integration correlation data to output to said access point; and
- a fifth multiplexer receiving said first imaginary-part correlation data, said second imaginary-part correlation data and said second integration correlation data, selects one of said first imaginary-part correlation data, said second imaginary-part correlation data and said second integration correlation data to output to said access point.

* * * * *